United States Patent
Lisin et al.

(10) Patent No.: US 9,920,499 B2
(45) Date of Patent: Mar. 20, 2018

(54) DEVICE FOR HEAT STABILIZATION OF PERENNIAL PERMAFROST SOILS

(71) Applicants: Public Joint Stock Company "Transneft", Moscow (RU); Joint-stock company "Transneft Siberia", Tyumen (RU); L.L.C. "Transneft Research and Development Institute for Oil and Oil Products Transportation", Moscow (RU)

(72) Inventors: Yury Viktorovich Lisin, Moscow (RU); Pavel Aleksandrovich Revel-Muroz, Moscow (RU); Aleksandr Nikolaevich Petelin, Aleksin (RU); Vitaly Ivanovich Surikov, Balashikha (RU); Yurii Borisovich Mikheev, Moscow (RU); Sergei Vasilievich Lakhaev, Moscow (RU)

(73) Assignees: PUBLIC JOINT STOCK COMPANY "TRANSNEFT", Moscow (RU); JOINT STOCK COMPANY "TRANSNEFT SIBERIA", Tyumen (RU); LIMITED LIABILITY COMPANY "TRANSNEFT RESEARCH AND DEVELOPMENT FOR OIL AND OIL PRODUCTS TRANSPORTATION", Moscow (RU)

( * ) Notice: Subject to any disclaimer, the term of this patent is extended or adjusted under 35 U.S.C. 154(b) by 0 days.

(21) Appl. No.: 15/226,882

(22) Filed: Aug. 2, 2016

(65) Prior Publication Data
US 2016/0340850 A1    Nov. 24, 2016

Related U.S. Application Data

(63) Continuation of application No. PCT/RU2014/000218, filed on Mar. 28, 2014.

(51) Int. Cl.
*E02D 3/115* (2006.01)
*E02D 31/14* (2006.01)
*E02D 3/11* (2006.01)

(52) U.S. Cl.
CPC ........... *E02D 3/115* (2013.01); *E02D 3/11* (2013.01); *E02D 31/14* (2013.01)

(58) Field of Classification Search
CPC .. E02D 31/14; E02D 3/11; E02D 3/115; F24J 3/086; Y02E 10/16; F28D 15/0283
(Continued)

(56) References Cited

U.S. PATENT DOCUMENTS 3,217,791 A     11/1965  Long
3,528,252 A *   9/1970   Gail .................. E02D 3/115
                                                      405/130
(Continued)

FOREIGN PATENT DOCUMENTS

CN      103590293      1/2016
RU      2168584        6/2001
(Continued)

OTHER PUBLICATIONS

Bayasan, Refik M. et al. *"Use of Two-Phase Heat Pipes with the Enlarges Heat-Exchange Surface for Thermal Stabilization of Permafrost Soils at the Bases of Structures"*; SeienceDirect, Applied Thermal Engineering 28, 2008; (4 pages).
(Continued)

*Primary Examiner* — Benjamin F Fiorello
*Assistant Examiner* — Stacy N Warren
(74) *Attorney, Agent, or Firm* — One LLP; Jonathan Jaech

(57) ABSTRACT

The invention relates to thermal engineering construction, particularly to individual seasonal cooling devices, or temperature stabilizers of soils. The solution is aimed to expand
(Continued)

temperature ranges at which temperature stabilizers can be installed and to prevent debris from sealing materials from entering into the well cavity having a coolant. The device contains a temperature stabilizer that functions as a two-phase thermal siphon and includes an aboveground condensing part and underground transporting and vaporizing parts. The temperature stabilizer is placed into the well along with coolant. The well is a hollow cylindrical body with a bottom and a capping element at a top end. The capping element includes a hole for receiving of the temperature stabilizer. The capping element is a detachable stuffing-box seal that includes a support ring installed on a round step in the well, a pressure ring, and thermally expanded graphite rings pressed therebetween.

10 Claims, 1 Drawing Sheet

(58) Field of Classification Search
USPC ..... 405/128.1, 128.35, 128.4, 128.55, 128.6, 405/130, 131, 302.4; 166/901; 165/45, 165/140.19, 104.21, 104.22, 104.26
See application file for complete search history.

(56) References Cited

U.S. PATENT DOCUMENTS

| | | | |
|---|---|---|---|
| 3,828,845 A | 8/1974 | Waters | |
| 3,866,424 A * | 2/1975 | Busey | F22B 1/02 122/32 |
| 3,911,683 A * | 10/1975 | Wolf | F03G 7/04 165/104.26 |
| 4,009,418 A * | 2/1977 | Bennett | H01F 27/18 165/104.14 |
| 4,036,286 A | 7/1977 | Anderson et al. | |
| 4,040,480 A * | 8/1977 | Richards | G21F 5/10 165/104.26 |
| 4,050,509 A * | 9/1977 | Bienert | F24J 3/086 165/104.22 |
| 4,240,268 A * | 12/1980 | Yuan | F24F 5/0046 126/400 |
| 4,256,317 A * | 3/1981 | Havens | F16J 15/20 277/535 |
| 4,271,681 A * | 6/1981 | Schertz | F25D 3/04 165/104.11 |
| 4,826,181 A * | 5/1989 | Howard | F16J 15/20 277/539 |
| 4,961,463 A | 10/1990 | DenHartog et al. | |
| 5,190,098 A | 3/1993 | Long | |
| 5,238,053 A | 8/1993 | Long | |
| 6,073,448 A * | 6/2000 | Lozada | F03G 7/04 60/641.1 |
| 9,200,850 B2 | 12/2015 | Yang | |
| 9,222,342 B2 | 12/2015 | Balczewski | |
| 9,291,372 B2 | 3/2016 | Yang | |
| 2012/0025119 A1* | 2/2012 | Griffin | F16J 15/166 251/315.1 |
| 2013/0174585 A1 | 7/2013 | Collet | |
| 2015/0292774 A1* | 10/2015 | Kang | F24J 3/084 165/104.21 |

FOREIGN PATENT DOCUMENTS

| | | |
|---|---|---|
| RU | 2256746 | 3/2005 |
| RU | 116871 | 6/2012 |
| RU | 2556591 | 7/2015 |
| RU | 2572319 | 1/2016 |
| RU | 2591272 | 7/2016 |
| SU | 737564 | 5/1980 |
| WO | WO2012/140324 | 10/2012 |

OTHER PUBLICATIONS

Okunev, S.N. et al.; "Ground Temperature Stabilization Systems' Designing Experience While "East Siberia-Pacific Ocean" and "Vankor Field-Purpe Station" Oil Pipelines' Building"; JSC Scientific Production Company "Fundamentstroiarkos", Tyumen; (9 pages).

* cited by examiner

# DEVICE FOR HEAT STABILIZATION OF PERENNIAL PERMAFROST SOILS

CROSS-REFERENCE TO RELATED APPLICATIONS

This application claims the benefit and priority of PCT Pat. App. No. PCT/RU2014/000218, titled DEVICE FOR HEAT STABILIZATION OF PERENNIAL PERMAFROST SOILS and filed on Mar. 28, 2014, also published as WO/2015/147683.

FIELD

The invention relates to the thermal engineering in construction and, more particularly, to design of individual seasonal cooling devices for placement in a well for temperature stabilization of permafrost and weak soils, such as for soil stabilization in foundations and structures, pipeline supports, power lines, bridges, railway ground works, creation of ground water cutoffs, and the like.

BACKGROUND

The use of artificial foundation soil cooling is used in various environments and provides benefits such as significantly decreasing construction periods and decreasing metal use in foundations due to a decreased length and number of piles required for proper support.

Temperature stabilizers are used for artificial freezing of thawed soils and for cooling of permafrost soils. In particular, temperature stabilizers are used to stabilize foundation soils to increase the load-bearing capacity of soil and pile foundations during construction, operation, and repair of pipelines and other structures of oil and gas transportation systems, maintenance of oil and gas fields, and other industrial and commercial structures installed in a permafrost zone.

Temperature stabilizers include leak-tight pipe constructions filled with a cooling agent. Temperature stabilizers include an aboveground portion (a condenser) and an underground portion (a vaporizer).

An effective method to maintain or to increase the frozen condition of the soil (i.e., decrease the temperature of the soil or reduce an increase in the temperature of the soil) in foundations of structures utilizes relatively low outdoor air temperatures along with vapor-liquid thermal siphons that are called temperature stabilizers. The operation of temperature stabilizers may vary by season, depending on an ambient air temperature.

A thermal siphon including a condensing section, a vaporizing section with a negative tilt, and a power fluid in the vaporizing section is disclosed by U.S. Pat. No. 4,961,463 (published on Sep. 10, 1990, IPC E02D13/115). This thermal siphon is inserted into soil without a well.

Compared with such designs of temperature stabilizers, the use of a well with a thermal siphon will allow replacement of temperature stabilizers without the use of any drilling equipment.

A temperature stabilizer that is placed in a well includes a cylindrical body with a top lid and a lower bottom. This stabilizer is disclosed by S. N. Okunev et al., Practice of temperature soil stabilizing systems for oil pipelines "ESPO" and "Vankor mine of OPS PURPE", materials of the international conference "Permafrost Resources of Polar and Mountain Regions. Condition and Prospects of the Engineering Permafrost Study, pp. 139-141, Tyumen, 2008).

The disadvantage of this solution is the need to use disposable materials (such as construction foam) during installation of the temperature stabilizer into the well. The disposable materials can only be used in certain temperatures. Another disadvantage is the need to remove sealing materials and to clean the internal surface of the well prior to replacement of the temperature stabilizer during operation.

The closest solution is a temperature stabilizing device that contains a well. A cavity of the well is filled with a non-freezing liquid, and cooling elements are installed into the well. The top of the well and the cooling pipe are equipped with a lid having a hole to receive the cooling element, and a filling port with a plug (disclosed by RF patent No. 11671, published on Oct. 6, 2012, E02D3/115).

SUMMARY

The objective of the present disclosure is to expand a temperature range in which installation of temperature stabilizers can occur and to reduce the likelihood of debris of sealing materials falling into a well cavity filled with coolant.

The technical result provided by the disclosure is an opportunity for multiple replacements of temperature stabilizers in a well while using the same sealing (capping) element, as well as expansion of the atmospheric air temperature range during which the temperature stabilizer can be installed into the well.

The objective is achieved using a temperature stabilizing device for permafrost soil conditions. The temperature stabilizing device includes a temperature stabilizer based on a two-phase thermal siphon that includes an aboveground condensing part and underground transporting and vaporizing parts. The temperature stabilizer is placed into a well having coolant. The well is a hollow cylindrical body having a bottom and a capping element at the top end with a hole for receiving the temperature stabilizer. The capping element is a detachable stuffing-box seal that includes a support ring installed on a round step in the well, a pressing ring, and sealing rings made of thermally expanded graphite positioned between the support ring and the pressing ring.

On the internal surface of the well, at the top, an internal thread is provided for receiving a packing nut used for pressing of sealing rings.

Sealing rings are formed out of thermally expanded graphite cord having a square cross-section. The size of its sides is equal to a distance between an external wall of the vaporizing section and an internal wall of the well. Joints of the sealing rings are displaced relative to each other.

A heat insulating insert is installed in a transporting portion of the device.

The well is filled with a coolant up to a level where seasonal soil thawing occurs.

BRIEF DESCRIPTION OF THE DRAWINGS

The present disclosure is illustrated by the corresponding drawings.

DETAILED DESCRIPTION

Figure 1:
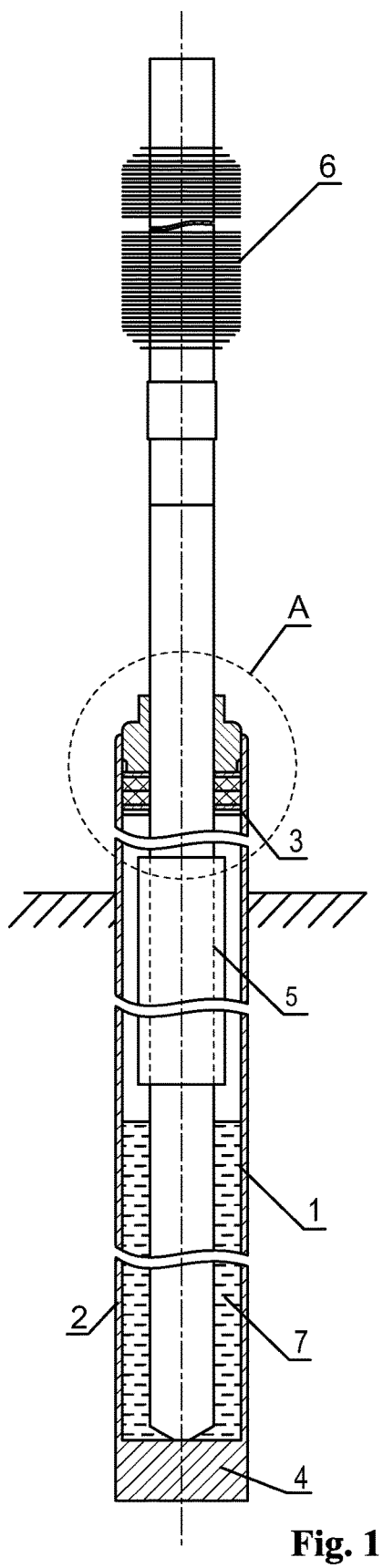
FIG. 1 illustrates a general longitudinal view of a device for heat stabilization.
Figure 2:
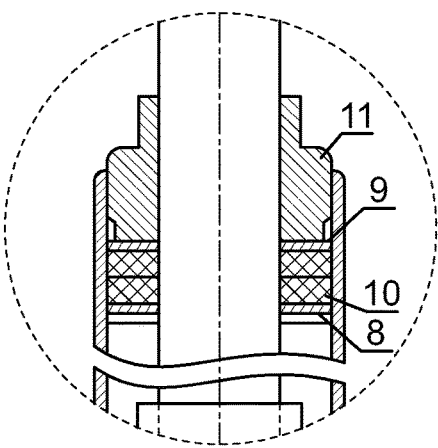
FIG. 2 illustrates a stuffing-box seal.

The following elements and corresponding reference numbers are shown in the drawings:

1 is a well,
2 is a cylindrical body,
3 is a stuffing box seal,
4 is a bottom,
5 is a temperature stabilizer,
6 is a heater,
7 is a cooling (anti-freezing) section,
8 is a support ring,
9 is a pressing ring,
10 is thermally expanded graphite rings, and
11 is a packing nut.

The device for heat stabilization in permafrost soils includes a well 1 that is a cylindrical body 2 equipped with a stuffing-box seal 3 at the top end and having a bottom 4 at the lower end. The temperature stabilizer 5 is located inside the case 2. The heater 6 is installed at the top end of the temperature stabilizer 5. The temperature stabilizer 5 has a lower vaporizing part, a middle transporting part, and a top condensing part. The well 1 is filled with an anti-freezing medium 7. The well 1 is filled with the anti-freezing medium 7 (coolant) to a height corresponding to where seasonal soil thawing occurs.

The stuffing-box seal 3 is located at the top of the temperature stabilizer's well 1 and includes a supporting ring 8 and a pressing ring 9, with two thermally expanded graphite rings 10 pressed between the supporting ring 8 and the pressing ring 9. The thermally expanded graphite rings 10 are formed from a cord having a square cross-section. The size of the side of the cord is equal to a distance between an external wall of the temperature stabilizer's vaporizing section and an internal wall of the well. Junctions of the cord's faces (joints of the rings 10) are located off-center to each other. The necessary waisting, or compression, of rings 10 is made by a packing nut with external thread 11. The thread for receiving the nut 11 is made on the internal surface of the well 1. A round step for the support ring 8 is made under the thread on the wall.

A heat insulating insert may be placed between the condensing and the vaporizing sections of the temperature stabilizer 5 in the form of a cylinder made of polymeric tube having a greater diameter than the stabilizer 5 and installed with an air gap between the temperature stabilizers body and the insert's internal surface.

The device is assembled as follows. First, the packing nut 11, the pressing ring 9, and the support ring 8 are consequently installed around the case of the temperature stabilizer 5 over its condensing part. After that, the temperature stabilizer 5 is placed into the well 1. The support ring 8 is thrusted against the round step. The thermally expanded graphite rings 10 are installed between the support ring 8 and pressing ring 9. Joints of the rings 10 are placed off-center relative to each other. The stuffing-box seal 3 of the well 1 is sealed by screwing the packing nut 11 into the well 1.

The temperature stabilizer operates due to the difference of temperatures between soils and atmospheric air, along with phase changes of the coolant (gravity forces "liquid to the bottom, vapor to the top", from the condenser to the vaporizer and vice versa). Coolants are substances able to change their physical condition, or state, between liquid and vapor if a proper temperature ratio exists between atmospheric air and soils, and provided that the temperature stabilizer has a certain pressure.

The device naturally operates in winter due to negative air temperatures, and may become dormant in summer (at positive air temperatures) due to a lack of coolant circulation. Detachable stuffing-box sealing prevents debris of sealing materials from reaching the well cavity, allows reuse of the sealing, and allows installation into the well 1 at an expanded air temperature range. If the temperature stabilizer is not operating properly, it can be replaced by a new one and the suggested detachable stuffing-box seal 3 can be reused.

The invention claimed is:

1. A device for temperature stabilization of permafrost soils, comprising:
    a hollow body having a top end, defining a well, and having an annular step near the top end;
    a temperature stabilizer that operates as a two-phase thermal siphon and includes an aboveground condensing portion and an underground vaporizing portion positioned in the well;
    an antifreeze medium filling only a lower portion of the well outside of the temperature stabilizer;
    an air gap in an upper portion of the well between the top end of the hollow body and the antifreeze medium; and
    a detachable stuffing-box seal defining an opening for receiving the temperature stabilizer and having a support ring configured to rest on the annular step, a pressure ring, and at least two expanded graphite sealing rings positioned between the support ring and the pressure ring.

2. The device of claim 1, further comprising a packing nut having external threading and wherein the hollow body further includes internal threading at the top end of the well for receiving the packing nut such that the packing nut compresses the at least two expanded graphite sealing rings.

3. The device of claim 1, wherein the at least two expanded graphite sealing rings are made of thermally expanded graphite cord.

4. The device of claim 3, wherein the at least two expanded graphite sealing rings have a side dimension equal to a distance between an external wall of the vaporizing portion and an internal wall of the well, and wherein joints of the at least two expanded graphite sealing rings are located off-center relative to each other.

5. The device of claim 1, wherein the temperature stabilizer includes a transporting portion between the underground vaporizing portion and the aboveground condensing portion and wherein the heat insulating insert is installed around the transporting portion.

6. The device of claim 5, wherein the transporting portion is at least partially positioned below ground.

7. The device of claim 1, wherein the well is inserted into a permafrost layer of earth and the antifreeze medium fills the lower portion of the well up to a height corresponding to a location in the earth where seasonal soil thawing occurs.

8. The device of claim 1, wherein the tubular heat insulating insert comprises a polymeric material.

9. The device of claim 1, wherein the temperature stabilizer comprises a transporting portion in the air gap between the underground vaporizing portion and the aboveground condensing portion, and the tubular heat insulating insert is around the transporting portion.

10. The device of claim 1, wherein the temperature stabilizer comprises a transporting portion in the air gap between the underground vaporizing portion and the aboveground condensing portion.

* * * * *